Oct. 4, 1966 S. SARETZKY 3,276,678
ELECTRICALLY DRIVEN FAN HAVING AIR BEARING SUPPORTED IMPELLER
Filed Dec. 10, 1964

INVENTOR:
SIMON SARETZKY
BY
Breitenfeld & Levine
ATTORNEYS

United States Patent Office 3,276,678
Patented Oct. 4, 1966

3,276,678
ELECTRICALLY DRIVEN FAN HAVING AIR BEARING SUPPORTED IMPELLER
Simon Saretzky, Port Washington, N.Y., assignor to IMC Magnetics Corp., Westbury, N.Y., a corporation of New York
Filed Dec. 10, 1964, Ser. No. 417,355
1 Claim. (Cl. 230—259)

This invention relates to electrically driven fans, and more particularly to such a fan employing an "air bearing" for rotatably supporting the fan impeller with respect to a mounting frame.

In these fans, a motor for rotating the impeller is supported by the mounting frame. A well known type of motor which I prefer for this purpose is an induction motor having an air supported rotor. Such motors are shown in the following U.S. patents: No. 2,889,474, No. 2,928,960, and No. 2,983,832. In one form, such a motor includes a stationary shaft mounted in cantilever fashion. The annular rotor of the induction motor, which carries the fan impeller, is slipped over the free end of the shaft into a position surrounding the shaft, and a film of air present between the relatively moving surfaces of the rotor and shaft serves as the lubricant. Since there is no positive connection between the rotor and shaft, and of course between the rotor and stator of the induction motor, the rotor under certain circumstances has a tendency to slip off the shaft. This tendency may be a result of the pull of gravity, if the fan is mounted with the free end of the shaft pointing down, or it may be a result of the force of the air on the fan impeller as the latter rotates. Consequently, means must be provided for limiting the axial movement of the rotor and impeller in the direction of removal from the shaft.

It is an object of the present invention to provide means for preventing removal of the rotor and impeller from the shaft, which means is totally unconnected to the shaft, rotor, or impeller.

It is another object of the invention to provide such means completely out of communication with the air bearing gap in order to prevent contamination of the latter.

It is a further object of the invention to provide such means capable of being conveniently affixed to the fan frame on a mass production basis, and capable of being readily removed from the frame in order to permit servicing of the motor.

To achieve these objects, the present invention provides a bracket capable of being secured to the fan frame by the same means which fastens the stator of the induction motor to the frame. The bracket comprises a ring having an inner diameter smaller than the outer diameter of the rotor, and legs offset from the plane of the ring for supporting the ring in concentric relation with and spaced axially from the rotor. As a result, the ring does not normally touch the rotor; however, should the latter slip in the direction of removal from the shaft, it moves into abutment with the ring and is prevented from slipping further.

Other objects and advantages of the invention will be apparent from the following description in which reference is made to the accompanying drawings.

Figure 1:
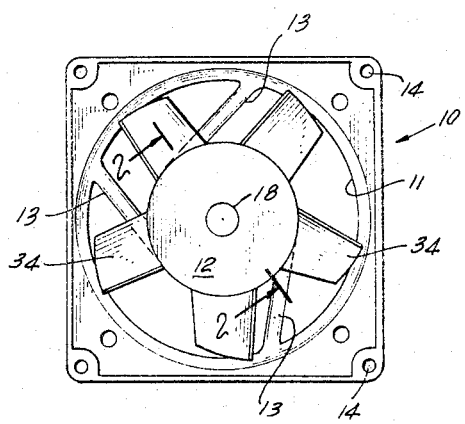
FIG. 1 is a front elevational view of a fan of the type to which this invention relates.

The fan chosen to illustrate this invention includes a frame 10 comprising a square outer portion provided with a central circular opening 11, and a motor support 12 held at the center of the opening 11 by a number of struts 13 extending between the support 12 and the outer portion of the frame. If desired, the entire frame can be formed as a single casting. At its corners, the frame 10 is provided with holes 14 for accommodating suitable fasteners (not shown). By means of these fastenres, the frame can be mounted in or near a region in which air is to be circulated.

The motor support 12 is a circular, cup-like element having a central bore 15. One end of a stationary cylindrical shaft 18 is fixed in the bore 15, by any suitable means such as a cement, and the balance of the shaft 18 projects from the support 12 in cantilever fashion. The shaft has a very smooth surface, and serves as the stationary member of an air bearing by means of which the impeller of the fan is rotatably supported.

The impeller is rotated by an induction motor comprising a stator 20 and rotor 21. The stator 20 is a generally annular shaped body having a central bore 22, and is fixed within the motor support 12 by suitable fastening means, such as the screws 23. The stator is provided with the usual field windings 25 (FIG. 3) which may be energized from any suitable source of electric current. The rotor 21 is an annular body located within the bore 22 of the stator, but unconnected to the stator. Fixed to the inner surface of the rotor is an axially-extending sleeve 26 formed of stainless steel or similar material, which serves as the rotating member of the air bearing. In order to provide the sleeve with a very smooth inner surface, it is desirable to line it with a glass tube 27 cemented to the sleeve. The end of the sleeve 26 adjacent to the free end of the shaft 18 is closed by a cap 28 cemented to the outer surface of the sleeve. Fastened to the inner surface of the end wall of the cap 28 is a disk 29 having a bump 30 projecting inwardly from its center. The bump 30, when it abuts the free end of the shaft 18, serves to limit the leftward movement of the sleeve 26 and attached rotor 21 with respect to the shaft 18, as viewed in FIG. 2. Secured to the rightward end of the rotor is a washer 31 of low-friction material.

Figure 3:
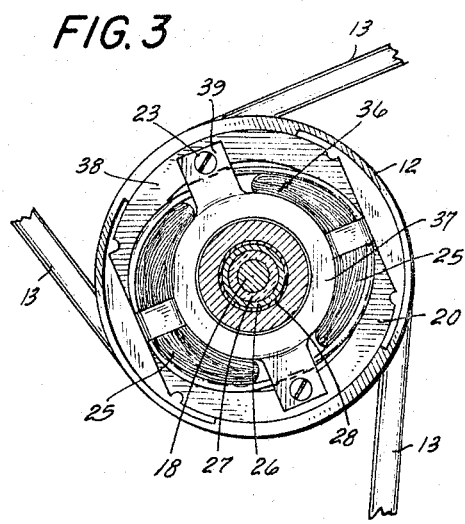
FIG. 3 is a vertical cross-sectional view taken on line 3—3 of FIG. 2.

The impeller of the fan comprises a generally cup-shaped hub 33 formed with radially projecting blades 34. At the center of its front wall, the hub presents an inwardly projecting collar 35 adapted to fit snugly over the cap 28. The collar may be removably or permanently secured to the cap 28, as desired. In the drawing, it is shown permanently cemented to the cap. Preferably, the hub 33, blades 34, and collar 35 are integrally formed of, for example, a suitable molded plastic. When the impeller is in place, as shown in FIG. 3, the side walls of the hub 33 terminate close to the side walls of the motor support 12, whereby the hub and motor support form a housing for the induction motor and air bearing.

Figure 2:
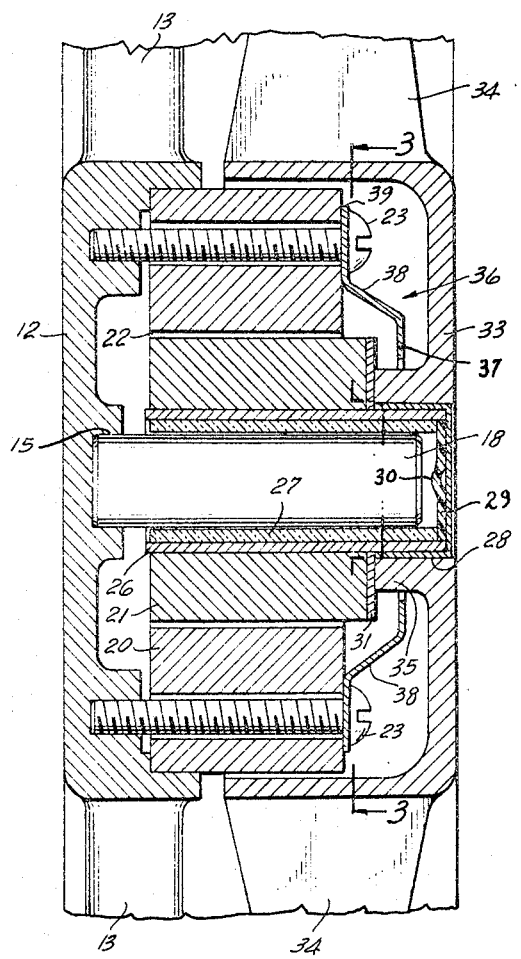
FIG. 2 is a fragmentary vertical cross-sectional view, on an enlarged scale, taken on line 2—2 of FIG. 1.

Upon inspection of FIG. 2, it will be apparent that in the absence of some movement limiting means, the assembly of the rotor 21, sleeve 26, and impeller 33, 34 is free to slip in the direction of removal from the shaft 18, i.e., a rightward direction in FIG. 2. This slippage will occur as a result of gravity if the fan is mounted with the free end of shaft 18 pointing down. Furthermore, if the impeller is rotated in a direction which causes air to move from right to left in FIG. 2, the reaction force of the air on the blades 34 will tend to move the impeller toward the right. Inadvertent removal of the rotor 21 and fan impeller from the shaft 18 is prevented, according to this invention, by a bracket 36. The bracket comprises a central ring 37 having an inner diameter smaller than the outer diameter of the rotor 21 but larger than the outer diameter of the cap 28. The ring is formed with a pair of diametrically opposed legs 38, projecting at an angle to the plane of the ring 37, which terminate in feet 39 arranged in a plane parallel to and spaced from the plane of the ring. Each foot 39 is provided with a hole for accommodating the shank of one of the screws 23, and consequently the bracket 36 can be secured to the motor support portion 12 of the fan frame 10 by the same fasteners 23 which secure the stator 20 to the frame.

When operatively positioned, the ring 37 of bracket 36 is concentrically arranged with the shaft 18, sleeve 26, and rotor 21. It will be seen that movement of the rotor 21 in the direction of removal from the shaft 18 will bring the washer 31 in engagement with the ring 37 of bracket 36 and thereby prevent any further movement in that direction. Since the washer 31 has a low-friction surface, engagement between it and the ring 37 will not seriously affect the continued rotation of the fan impeller.

It should be pointed out that use of the bracket 36, according to this invention permits the rotor 21, sleeve 26, and cap 28 to be completely and permanently assembled, as an independent unit before assembly of the unit with the stator 20 and shaft 18. The rotor, sleeve, and cap unit is then slipped over the free end of shaft 18 into the position shown in the drawings. This convenience in assembly is a result of the fact that the bracket 36 of this invention is unconnected to the rotor 21, sleeve 26, cap 28, or shaft 18. Furthermore, the fact that the bracket is connected to a stationary body, the frame 10, rather than to one of the rotating elements, makes it possible to quickly mount the bracket. In addition, it will be noted that the bracket is completely out of communication with the air bearing gap, i.e., the gap between the shaft 18 and tube 27, and therefore there is no chance of this gap becoming contaminated as a result of the presence of the bracket or the procedure during which it is mounted.

Operation of the fan is thought to be obvious. When electric current is applied to the windings 25, the rotor 21 rotates, with respect to the stator 20, about the axis of shaft 18. The sleeve 26 and impeller 33, 34, of course, rotate with the rotor. During relative rotation between the shaft 18 and the sleeve 26 (or more correctly the tube 27), a load-supporting film of air develops between them thereby providing a radial clearance between the opposed surfaces of the shaft 18 and the tube 27.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claim.

What is claimed is:

An electrically driven fan comprising a frame, an induction motor having a stator and an annular shaped rotor, fastening means securing said stator to said frame, a fan impeller fixed to said rotor, said impeller being spaced axially from said stator to define a cavity between the stator and impeller, a shaft fixed at one end to said frame and projecting in cantilever fashion therefrom, said shaft serving as the stationary member of an air bearing for said rotor, a sleeve fixed within said rotor serving as the rotating member of the air bearing, said sleeve and rotor being slipped over the free end of said shaft into a position surrounding said shaft, the end of said sleeve adjacent to the free end of said shaft being closed, and a ring formed of rigid material arranged within said cavity, the inner diameter of said ring being smaller than the outer dameter of said rotor, and said fastening means supporting said ring in concentric relation with and spaced axially from said rotor.

References Cited by the Examiner
UNITED STATES PATENTS
3,158,412   11/1964   Willhoeft et al.

ROBERT M. WALKER, *Primary Examiner.*